United States Patent
Tsuboi

(10) Patent No.: US 11,820,019 B2
(45) Date of Patent: Nov. 21, 2023

(54) ROBOT CONTROL APPARATUS AND ROBOT CONTROL METHOD

(71) Applicant: SONY CORPORATION, Tokyo (JP)

(72) Inventor: Toshimitsu Tsuboi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 401 days.

(21) Appl. No.: 17/056,163

(22) PCT Filed: Mar. 29, 2019

(86) PCT No.: PCT/JP2019/014190
§ 371 (c)(1),
(2) Date: Nov. 17, 2020

(87) PCT Pub. No.: WO2019/225158
PCT Pub. Date: Nov. 28, 2019

(65) Prior Publication Data
US 2021/0213611 A1 Jul. 15, 2021

(30) Foreign Application Priority Data

May 22, 2018 (JP) .................. 2018-098098

(51) Int. Cl.
*G05B 19/04* (2006.01)
*B25J 9/16* (2006.01)
*B25J 13/08* (2006.01)

(52) U.S. Cl.
CPC .......... *B25J 9/1661* (2013.01); *B25J 9/1653* (2013.01); *B25J 9/1697* (2013.01); *B25J 13/085* (2013.01); *B25J 13/087* (2013.01); *B25J 13/088* (2013.01)

(58) Field of Classification Search
CPC ...... B25J 9/1679; B25J 9/1669; B25J 9/1697; B25J 9/163; B25J 9/161; B25J 9/1664; B25J 9/1661; B25J 9/1653; B25J 13/088; B25J 13/085; B25J 13/087
USPC ......................................... 700/245
See application file for complete search history.

(56) References Cited

U.S. PATENT DOCUMENTS

| 6,429,617 | B1 | 8/2002 | Sano et al. |
| 9,104,195 | B2 * | 8/2015 | Daniel ............ G05B 19/41865 |
| 9,486,918 | B1 * | 11/2016 | Earl ........................ B25J 9/163 |
| 10,427,300 | B2 * | 10/2019 | Boca ..................... B25J 9/1664 |

(Continued)

FOREIGN PATENT DOCUMENTS

| GB | 2355547 A | 4/2001 |
| JP | 2001-117618 A | 4/2001 |

(Continued)

OTHER PUBLICATIONS

International Search Report and Written Opinion of PCT Application No. PCT/JP2019/014190, dated Jun. 18, 2019, 11 pages of ISRWO.

*Primary Examiner* — Dalena Tran
(74) *Attorney, Agent, or Firm* — CHIP LAW GROUP

(57) ABSTRACT

There is provided a robot control apparatus including a determination unit configured to determine whether or not an end condition of a task is satisfied when a robot performs the task, and a switching unit configured to perform switching to a next task corresponding to the end condition in a case where the end condition is satisfied. With this configuration, it is possible to optimally switch tasks of the robot depending on the situation.

11 Claims, 11 Drawing Sheets

(56) References Cited

U.S. PATENT DOCUMENTS

| | | | | |
|---|---|---|---|---|
| 2011/0270444 A1* | 11/2011 | Nagata | ............... | G05B 19/401 |
| | | | | 901/46 |
| 2015/0301878 A1* | 10/2015 | Chen | ................ | G06F 11/3676 |
| | | | | 714/48 |
| 2018/0025664 A1* | 1/2018 | Clarke | .................. | G09B 5/02 |
| | | | | 434/257 |

FOREIGN PATENT DOCUMENTS

| | | |
|---|---|---|
| JP | 2011-224696 A | 11/2011 |
| JP | 2012-125852 A | 7/2012 |
| JP | 2012-143844 A | 8/2012 |
| JP | 2012-215959 A | 11/2012 |
| JP | 2017-506169 A | 3/2017 |
| JP | 2017-087316 A | 5/2017 |
| JP | 2018-039059 A | 3/2018 |

\* cited by examiner

FIG.5

| No. | TASK NAME | END CONDITION 1 | TASK NUMBER TO BE EXECUTED AFTER END 1 | END CONDITION 2 | TASK NUMBER TO BE EXECUTED AFTER END 2 | END CONDITION 3 | TASK NUMBER TO BE EXECUTED AFTER END 3 |
|---|---|---|---|---|---|---|---|
| 1 | CRACK EGG | IMAGE OF BEAUTIFULLY CRACKED EGG | 5 | IMAGE WITH SHELL | 2 | IMAGE WITH YOLK BROKEN | 3 |
| 2 | REMOVE SHELL OF EGG | IMAGE OF BEAUTIFULLY CRACKED EGG | 5 | IMAGE OF BROKEN YOLK | 3 | - | - |
| 3 | DISCARD EGG | IMAGE OF DISCARDED EGG | 1 | IMAGE OF CONTAINER DIRTY WITH EGG | 4 | - | - |
| 4 | REPLACE CONTAINER | IMAGE OF DISCARDED EGG IMAGE OF CONTAINER | 1 | - | - | - | - |
| 5 | ADD OIL IN PAN | IMAGE OF PAN WITH OIL (WEIGHT OF ADDED OIL IS 30 g) | 7 | IMAGE OF PAN WITH OIL (WEIGHT OF ADDED OIL IS 50 g) | 6 | - | - |
| 6 | REMOVE OIL FROM PAN | WEIGHT OF OIL AFTER REMOVAL ≒ 30 g | 7 | - | - | - | - |
| 7 | TURN ON HEAT AND ADJUST HEAT LOWER | TEMPERATURE OF PAN IS XX°C | 8 | - | - | - | - |
| 8 | PUT EGG IN PAN | IMAGE OF EGG IN PAN | 10 | IMAGE WITH YOLK BROKEN | 9 | - | - |
| 9 | REMOVE EGG AND OIL FROM PAN | IMAGE OF PAN | 1 | - | - | - | - |
| 10 | COVER PAN WITH LID | IMAGE OF YOLK WITH SLIGHTLY WHITE SURFACE | 11 | IMAGE OF BURNT FRIED EGG | 9 | - | - |
| 11 | TURN OFF HEAT | IMAGE OF YOLK WITH SLIGHTLY WHITE SURFACE | 12 | - | - | - | - |
| 12 | DISH UP FRIED EGG | IMAGE OF FRIED EGG DISHED UP ON PLATE | ALL TASKS END | IMAGE OF BROKEN FRIED EGG | 9 | - | - |

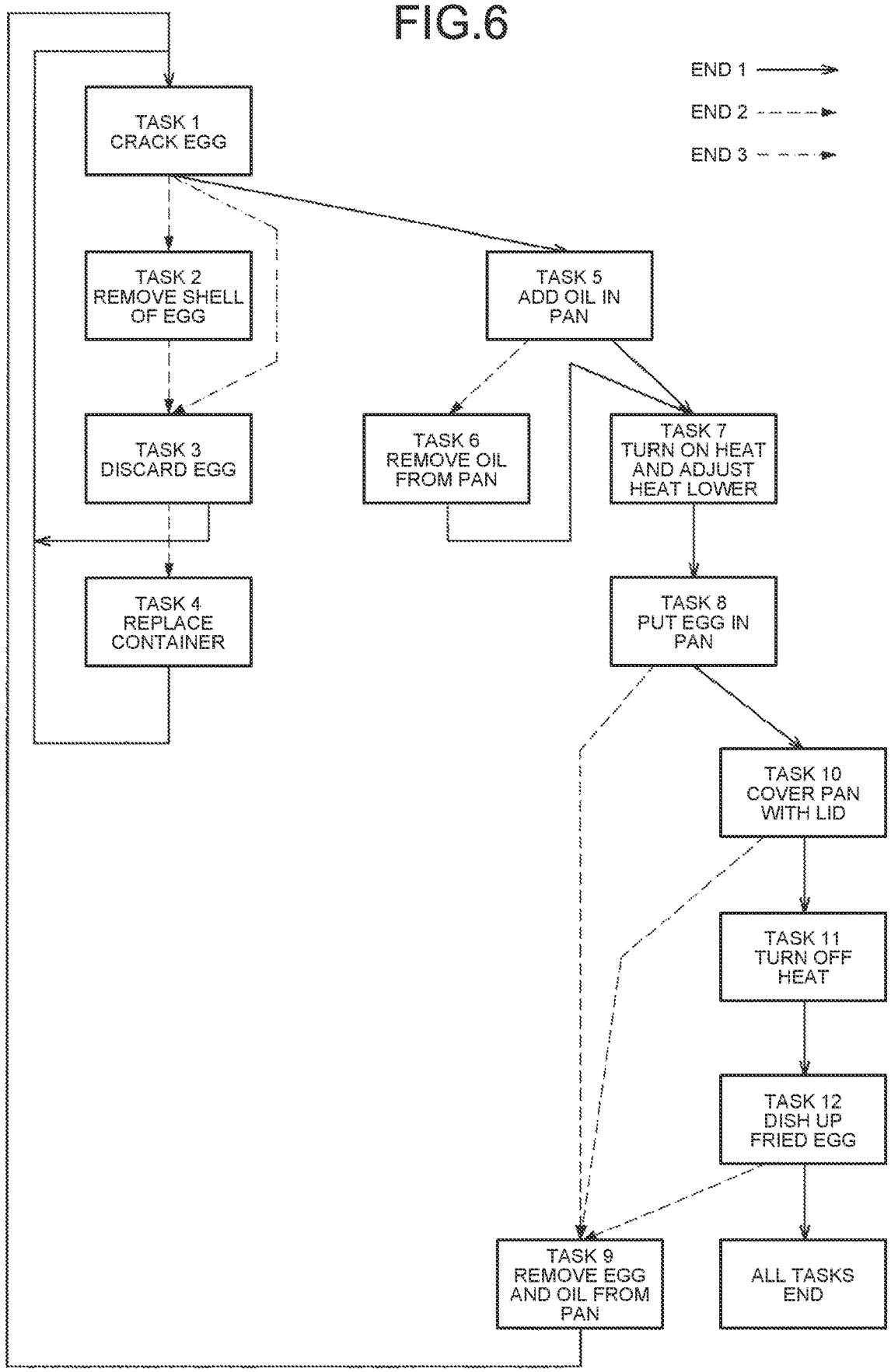

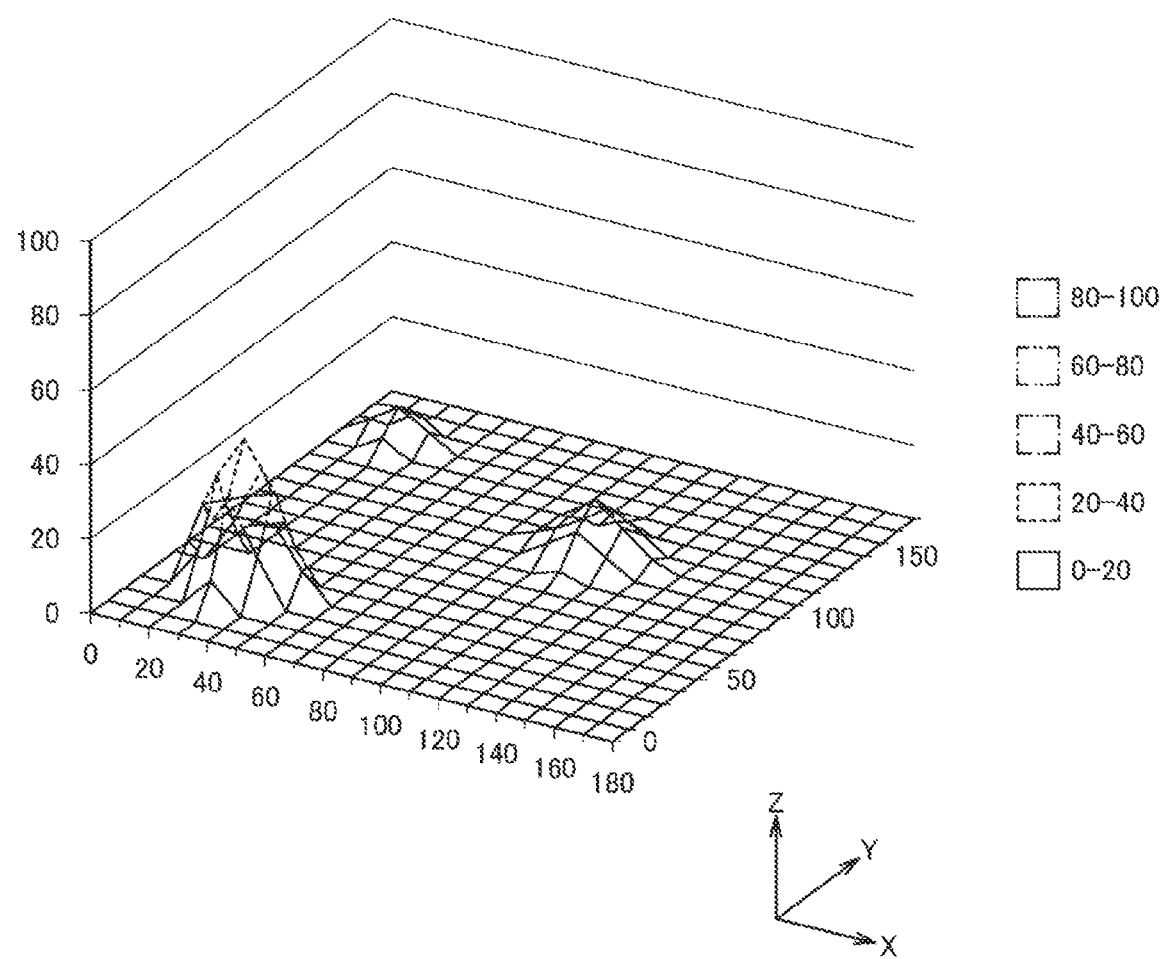

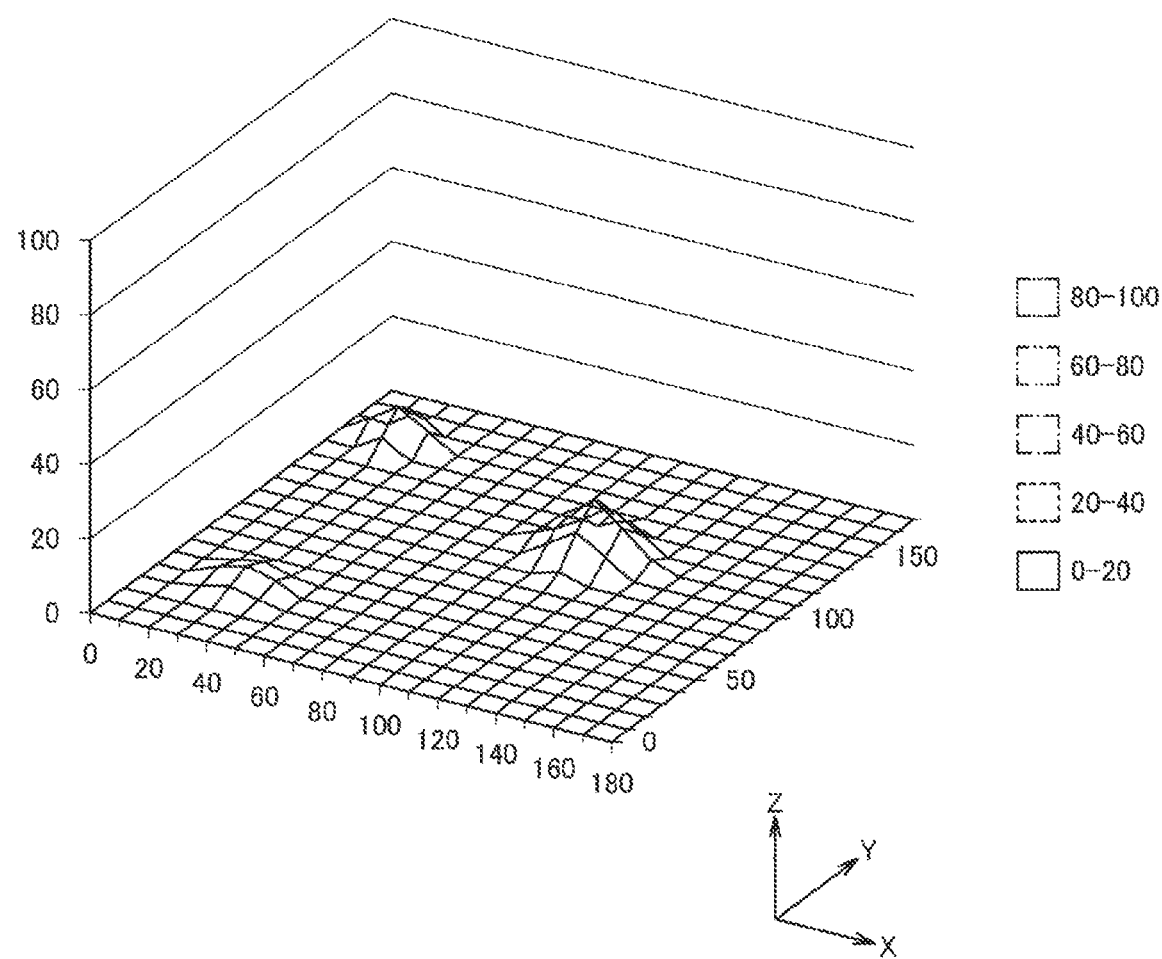

ROBOT CONTROL APPARATUS AND ROBOT CONTROL METHOD

CROSS REFERENCE TO RELATED APPLICATIONS

This application is a U.S. National Phase of International Patent Application No. PCT/JP2019/014190 filed on Mar. 29, 2019, which claims priority benefit of Japanese Patent Application No. JP 2018-098098 filed in the Japan Patent Office on May 22, 2018. Each of the above-referenced applications is hereby incorporated herein by reference in its entirety.

FIELD

The present disclosure relates to a robot control apparatus and a robot control method.

BACKGROUND

Conventionally, for example, Patent Literature 1 below discloses that a process of cooking by a cook and a heating power are recorded, a heating power is adjusted and a control program is created on the basis of the recorded process and heating power, and a robot performs cooking.

CITATION LIST

Patent Literature

Patent Literature 1: JP 2017-506169 A

SUMMARY

Technical Problem

Various methods have been proposed for switching tasks of a robot. There are many industrial robots that perform assembly, processing, and the like, which have target positions of the robots programmed or taught in advance, perform predetermined operations, and execute tasks such as assembly and painting.

These robots perform preset operations on the basis of a preset program, that is, predetermined work at preset positions, and when all the set operations are performed, end the tasks without any particular determination. However, the robots cannot change the preset operations depending on the situation. That is, there is a problem that contents of the tasks cannot be changed or the tasks cannot be switched.

The technique disclosed in Patent Literature 1 described above also has a problem in that, although tasks can be preset, contents of the tasks cannot be changed or the tasks cannot be switched depending on the situation.

Therefore, it has been desired to optimally switch tasks of a robot depending on the situation.

Solution to Problem

According to the present disclosure, a robot control apparatus is provided. The robot control apparatus includes a determination unit configured to determine whether or not an end condition of a task is satisfied when a robot performs the task and a switching unit configured to perform switching to a next task corresponding to the end condition in a case where the end condition is satisfied.

Moreover, according to the present disclosure, a robot control method is provided. The robot control method includes determining whether or not an end condition of a task is satisfied when a robot performs the task and performing switching to a next task corresponding to the end condition in a case where the end condition is satisfied.

Advantageous Effects of Invention

As described above, according to the present disclosure, it is possible to optimally switch tasks of a robot depending on the situation.

Note that the effects described above are not necessarily limitative, and any of the effects described in the present specification or other effects that can be grasped from the present specification may be exhibited in addition to or in place of the effects described above.

BRIEF DESCRIPTION OF DRAWINGS

FIG. 5 is a schematic diagram illustrating a sequence for "cooking a fried egg" created by combining tasks.

FIG. 6 is a schematic diagram illustrating the sequence illustrated in FIG. 5 in the form of a flowchart.

FIG. 10B is a schematic diagram for describing an end condition in the case where the robot cleans an ammonia odor.

FIG. 10C is a schematic diagram for describing an end condition in the case where the robot cleans an ammonia odor.

DESCRIPTION OF EMBODIMENTS

Hereinafter, preferred embodiments of the present disclosure will be described in detail with reference to the accompanying drawings. Note that, in the present specification and the drawings, components having substantially the same functional configuration are denoted by the same reference signs, and a duplicate description will be omitted.

Note that the description will be made in the following order.

Figure 1:
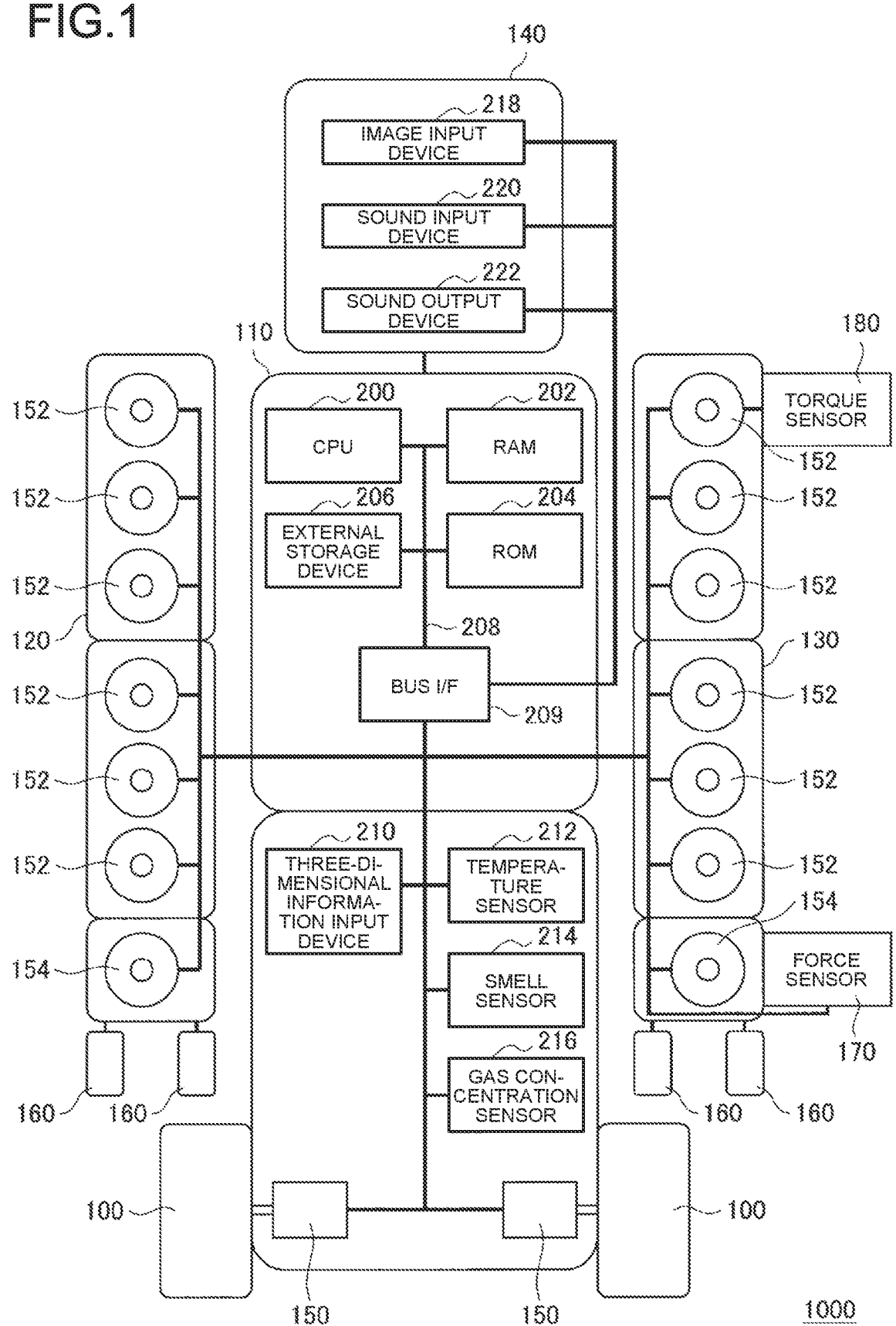
FIG. 1 is a schematic diagram illustrating a schematic configuration of hardware of a robot according to an embodiment of the present disclosure.

1. Hardware Configuration of Robot
2. Software Configuration of Robot
3. Task Switching Processing of Robot
4. Specific Example of Switching Tasks
5. Examples of Other Tasks 1. Hardware Configuration of Robot First, a schematic configuration of hardware of a robot 1000 according to an embodiment of the present disclosure will be described with reference to FIG. 1. As illustrated in FIG. 1, the robot 1000 includes wheels 100 for movement, a body 110, arms 120 and 130, and a head 140.

The wheels 100 are driven by actuators 150. When the wheels 100 are driven, the robot 1000 moves. The arms 120 and 130 have multiple joints, and each joint is provided with an actuator 152. The arms 120 and 130 are bent by driving of the actuators 152. Each joint of the arms 120 and 130 is provided with an encoder that detects an angle of the joint. Similarly, an encoder that detects a rotation angle of the wheel 100 is provided near the wheel 100.

Hands 160 are provided at tips of the arms 120 and 130. The hands 160 are driven by driving of actuators 154 to exert forces for gripping an object, pressing an object, and the like.

A force sensor 170 is provided at a tip of the hand 160 and detects a gripping force when the hand 160 grips an object and a pressure when the hand 160 pushes an object. A torque sensor 180 is provided to each joint and detects torque of each joint. The force sensor 170 may be provided to the hand 160 of each hand.

The body 110 includes a CPU 200, a RAM 202, a ROM 204, an external storage device 206, a bus 208, and a bus interface (bus I/F) 209. The external storage device 206 is a storage device connected from outside the robot 1000. The CPU 200, the RAM 202, the ROM 204, the external storage device 206, and the bus I/F 209 are connected via the bus 208.

In addition, the body 110 includes a three-dimensional information input device 210, a temperature sensor 212, a smell sensor 214, and a gas concentration sensor 216. The three-dimensional information input device 210 includes, for example, a time of flight (TOF) sensor, and acquires three-dimensional information of an object. The temperature sensor 212 includes a radiation thermometer, a contact thermometer, and the like. The gas concentration sensor 216 is, for example, a sensor that detects a concentration of a gas such as ammonia. These various sensors are connected to the CPU 200 and the like of the body 110 via the bus I/F 209. Each of these various sensors may also be provided in the robot apparatus 1000 in plural number.

The head 140 includes an image input device 218, a sound input device 220, and a sound output device 222. These devices are also connected to the CPU 200 and the like of the body 110 via the bus I/F 209. As an example, the image input device 218 includes a camera, the sound input device 220 includes a microphone, and the sound output device 222 includes a speaker.

2. Software Configuration of Robot

Figure 2:
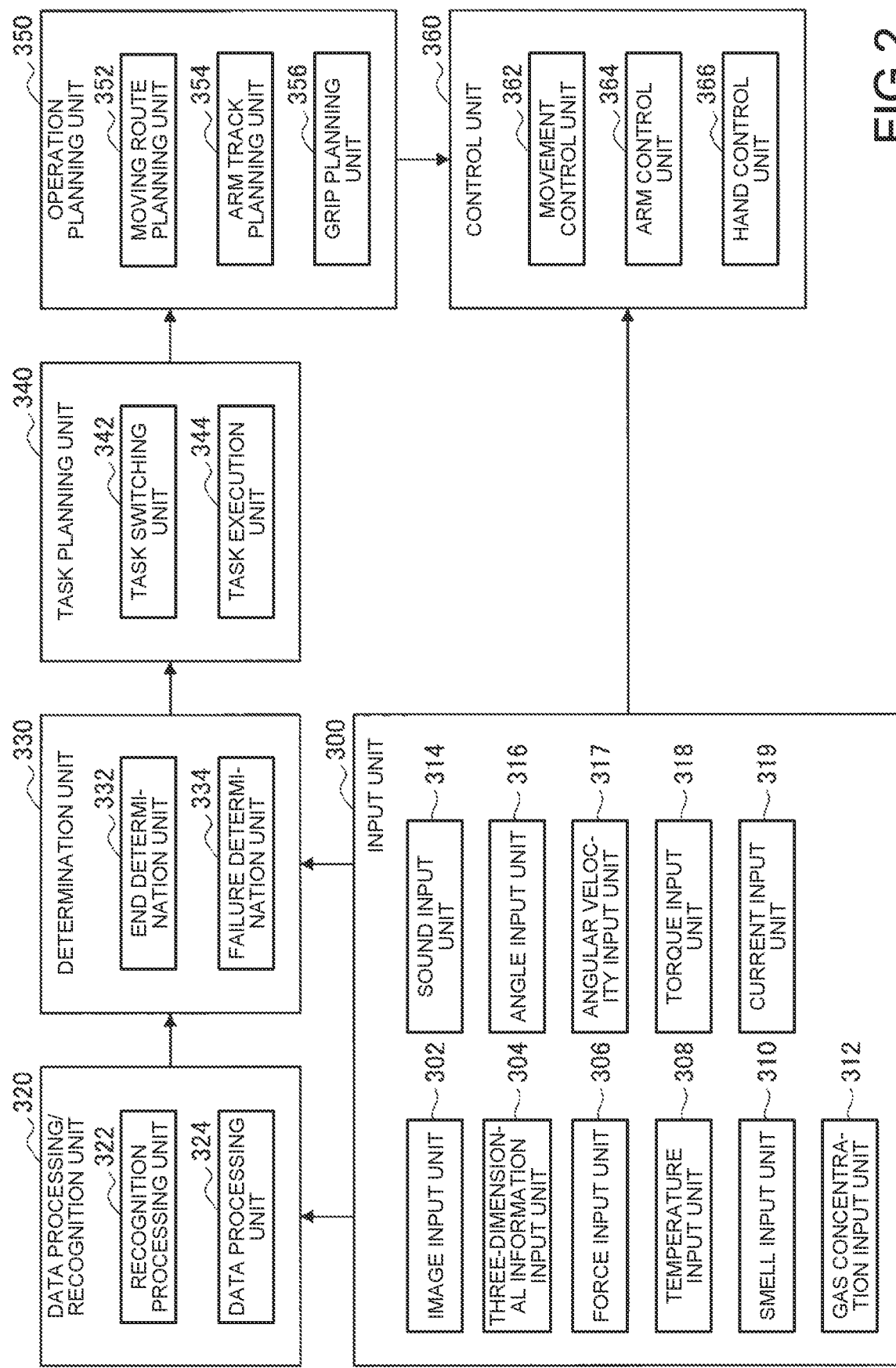
FIG. 2 is a schematic diagram illustrating a software configuration of the robot.

Next, a software configuration of the robot 1000 will be described. FIG. 2 is a schematic diagram illustrating the software configuration of the robot 1000. Each component illustrated in FIG. 2 includes the CPU 200 and software (a program) for causing the CPU 200 to function. The program can be stored in the ROM 204 or the external storage device 206. The software configuration of the robot 1000 is roughly divided into an input unit 300, a data processing/recognition unit 320, a determination unit 330, a task planning unit 340, an operation planning unit 350, and a control unit 360.

Various types of information from the outside are input to the input unit 300 via various sensors and the like included in the robot 1000. The input unit 300 includes an image input unit 302, a three-dimensional information input unit 304, a force input unit 306, a temperature input unit 308, a smell input unit 310, a gas concentration input unit 312, a sound input unit 314, an angle input unit 316, an angular velocity input unit 317, a torque input unit 318, and a current input unit 319.

Data of an image captured by the camera serving as the image input device 218 is input to the image input unit 302. Three-dimensional information of an object input to the three-dimensional information input device 210 is input to the three-dimensional information input unit 304. A force detected by the force sensor 170 is input to the force input unit 306. Temperature detected by the temperature sensor 212 is input to the temperature input unit 308. Data of a smell detected by the smell sensor 214 is input to the smell input unit 310. A gas concentration detected by the gas concentration sensor 216 is input to the gas concentration input unit 312.

In addition, data of sound acquired by the microphone serving as the sound input device 220 is input to the sound input unit 314. An angle detected by encoding of each joint of the arms 120 and 130, a rotation angle of the wheel 100, and the like are input to the angle input unit 316. An angular velocity when each joint of the arms 120 and 130 moves and angular velocities of the actuators 150 that drive the wheels 100 are input to the angular velocity input unit 317. Note that an angular velocity may be calculated by a data processing unit 324 on the basis of a rotation angle. Torque detected by the torque sensor 180 is input to the torque input unit 318. A current of each actuator is input to the current input unit 319.

The data processing/recognition unit 320 processes and recognizes various data input to the input unit 300. The data processing/recognition unit 320 includes a recognition processing unit 322 and the data processing unit 324.

The determination unit 330 makes a determination on the basis of data processed and recognized by the data processing/recognition unit 320. The determination unit 330 includes an end determination unit 332 and a failure determination unit 334. The determination unit 330 can also make a determination directly on the basis of various data input to the input unit 300.

The task planning unit 340 plans tasks on the basis of a determination result of the determination unit 330. The task planning unit 340 includes a task switching unit 342 and a task execution unit 344.

The operation planning unit 350 plans operations of the robot 1000. The operation planning unit 350 includes a moving route planning unit 352, an arm track planning unit 354, and a grip planning unit 356.

The control unit 360 controls the robot 1000 by controlling each actuator of the robot 1000. The control unit 360 includes a movement control unit 362, an arm control unit 364, and a hand control unit 366.

3. Task Switching Processing of Robot

Next, task switching processing of the robot 1000 according to the present embodiment will be described. The robot 1000 according to the present embodiment executes various tasks and switches the tasks depending on success or failure of the tasks. Contents of the tasks are not particularly limited, but in the case of a robot used in a home, examples of the tasks include "cooking" and "cleaning".

Figure 3:
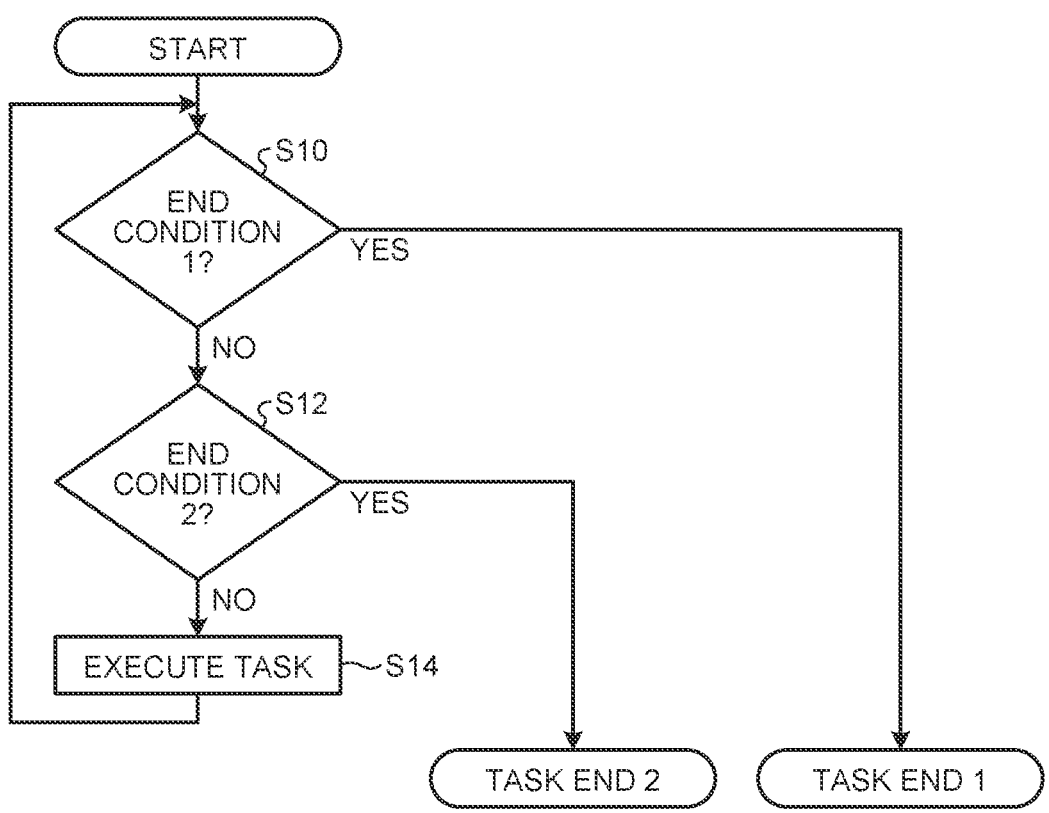
FIG. 3 is a flowchart illustrating processing of a single task executed by the robot.

FIG. 3 is a flowchart illustrating processing of a single task executed by the robot 1000. First, in Step S10, it is determined whether or not an end condition 1 of the task is satisfied, and in a case where the end condition 1 of the task is satisfied, the processing branches to a task end 1.

On the other hand, in a case where the end condition 1 of the task is not satisfied in Step S10, the processing proceeds to Step S12. In Step S12, it is determined whether or not an end condition 2 of the task is satisfied, and in a case where the end condition 2 of the task is satisfied, the processing branches to a task end 2.

In addition, in a case where the end condition 2 of the task is not satisfied in Step S12, the processing proceeds to Step S14. In the case where the processing proceeds to Step S14, the task is executed because neither the end condition 1 nor the end condition 2 of the task is satisfied. After Step S14, the processing returns to Step S10.

The case where the processing proceeds to the task end 1 has a higher priority than the case where the processing proceeds to the task end 2, and the task end 1 is the more preferable end of the task. For example, the case where the processing proceeds to the task end 1 is a case where the task ends successfully, and the case where the processing proceeds to the task end 2 is a case where the task ends in failure. In the case where the task ends in failure, switching to the next task is made to recover from the failure. In other words, the task end 1 corresponding to the end condition 1 leads to a final task of a series of sequences, and the task end 2 corresponding to the end condition 2 corresponds to a task for recovering the failure of the task.

As described above, in the processing of the single task illustrated in FIG. 3, the processing proceeds to the task end 1 when the end condition 1 is satisfied, the processing proceeds to the task end 2 when the end condition 2 is satisfied, and a task execution operation is continued when neither the end condition 1 nor the end condition 2 is satisfied.

Figure 4:
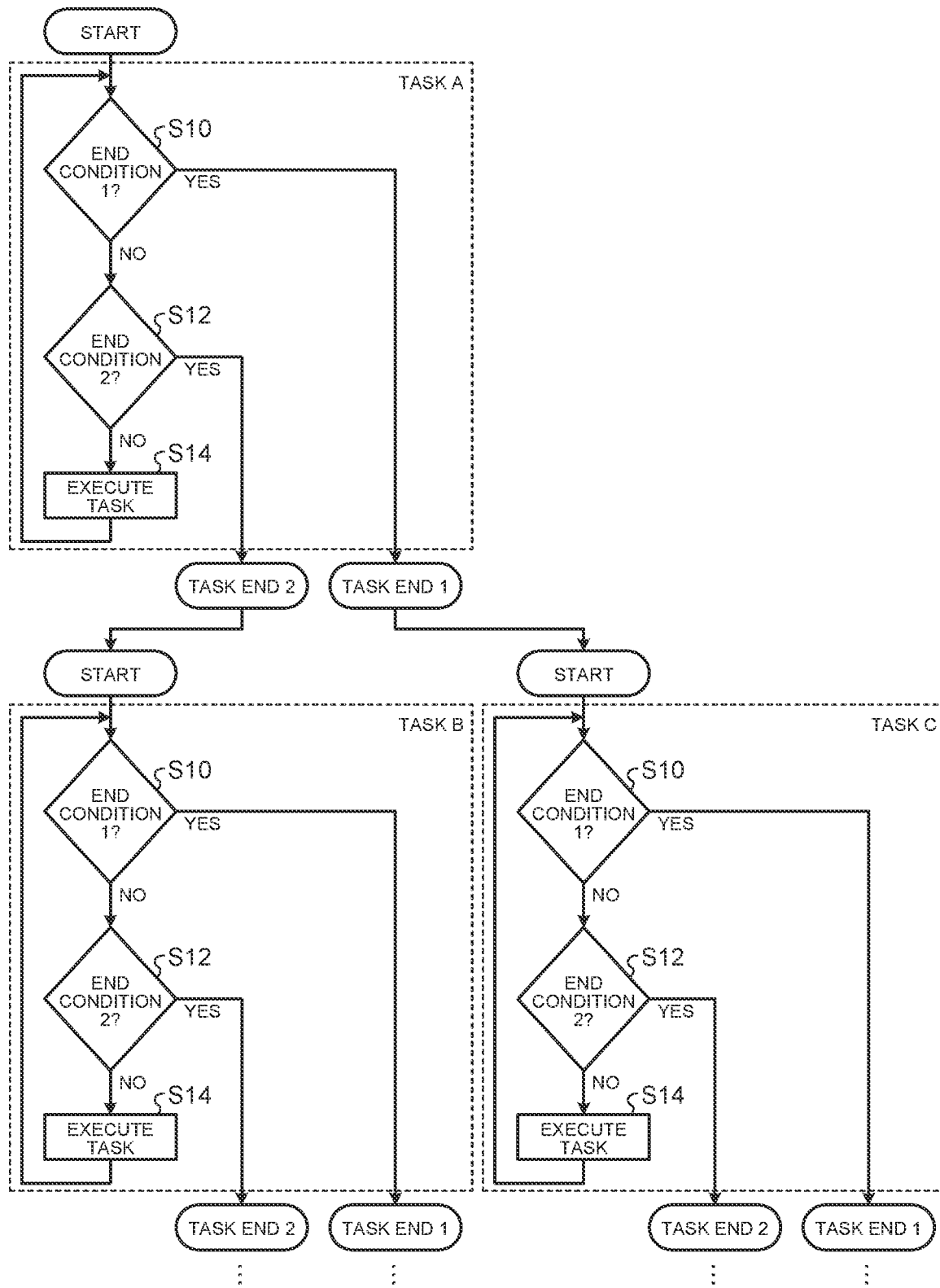
FIG. 4 is a schematic diagram illustrating a sequence in which single tasks as illustrated in FIG. 3 are combined.

FIG. 4 is a schematic diagram illustrating a sequence in which single tasks as illustrated in FIG. 3 are combined. In the example illustrated in FIG. 4, three tasks A, B, and C are combined. When the task A satisfies an end condition 1, the task B is executed. In addition, when the task A satisfies an end condition 2, the task C is executed. Furthermore, tasks to be executed next are set depending on end conditions of each of the tasks B and C. As described above, by combining single tasks, any complicated sequence performed by the robot 1000 can be constructed as a combination of the tasks. With this configuration, contents of tasks can be easily set, and a sequence in which tasks are combined can also be easily set. In addition, for example, in a case where an amount of food materials, which is an end condition, is changed, various end conditions can be reset only by switching a single task, and an operation of the robot 1000 can be intuitively set without any special programming.

4. Specific Example of Switching Tasks

FIG. 5 is a schematic diagram illustrating a sequence for "cooking a fried egg" created by combining tasks. In addition, FIG. 6 is a schematic diagram illustrating the sequence illustrated in FIG. 5 in the form of a flowchart. The sequence includes 12 tasks (tasks 1 to 12) in total. The sequence starts from execution of the task 1, and the tasks are switched depending on end conditions. When an end condition 1 of the task 12 is satisfied, all the tasks are successfully executed and the sequence ends. Specifically, contents of the tasks are as follows.

Task 1 "crack an egg"
Task 2 "remove a shell of the egg"
Task 3 "discard the egg"
Task 4 "replace a container"
Task 5 "add oil in a pan"
Task 6 "remove oil from the pan"
Task 7 "turn on heat and adjust the heat lower"
Task 8 "put the egg in the pan"
Task 9 "remove the egg and the oil from the pan"
Task 10 "cover the pan with a lid"
Task 11 "turn off the heat"
Task 12 "dish up a fried egg"

When description is made using the task 1 "crack an egg" as an example, an end condition 1 of the task 1 is "the egg cracks beautifully", and the end condition 1 is determined by "an image of a beautifully cracked egg". When the end condition 1 is satisfied, the task 1 is switched to the task 5 "add oil in a pan" as indicated by a "task number to be executed after end 1" in FIG. 5. FIG. 6 indicates that, when the end condition 1 is satisfied in the task 1, the task 1 is switched to the task 5 following an arrow of "end 1".

In addition, an end condition 2 of the task 1 is "a shell enters the egg", and the end condition 2 is determined by "an image with a shell". When the end condition 2 is satisfied, the task 1 is switched to the task 2 "remove a shell of the egg" as indicated by a "task number to be executed after end 2" in FIG. 5. FIG. 6 indicates that, when the end condition 2 is satisfied in the task 1, the task 1 is switched to the task 2 following an arrow of "end 2".

Similarly, when description is made using the task 5 "add oil in a pan" as an example, an end condition 1 of the task 5 is "the weight of the added oil is 30 g", and the end condition 1 is determined by "an image of the pan with oil". When the end condition 1 is satisfied, the task 5 is switched to the task 7 "turn on heat and adjust the heat lower" as indicated by the "task number to be executed after end 1" in FIG. 5. FIG. 6 indicates that, when the end condition 1 is satisfied in the task 5, the task 5 is switched to the task 7 following an arrow of the "end 1". Note that the weight of the added oil may be directly measured by a sensor to determine whether or not the end condition 1 is satisfied. For example, the weight of an object being gripped can be measured by measuring a component in the direction of gravity of the force sensor 170 provided to the hand 160.

In addition, an end condition 2 of the task 5 is "the weight of the added oil is 50 g or more", and the end condition 2 is determined by "an image of the pan with oil". When the end condition 2 is satisfied, the task 5 is switched to the task 6 "remove oil from the pan" as indicated by the "task number to be executed after end 2" in FIG. 5. FIG. 6 indicates that, when the end condition 2 is satisfied in the task 5, the task 5 is switched to the task 6 following an arrow of the "end 2". Note that the weight of the added oil may be directly measured by a sensor to determine whether or not the end condition 2 is satisfied.

As described above, the tasks are switched depending on the end conditions 1 to 3. Basically, the end condition 1 corresponds to a success condition of each task. When the end condition 1 is satisfied for each task, the sequence of FIG. 5 ends. On the other hand, when any one of the tasks satisfies the end condition 2 or the end condition 3, a task for recovery is performed so that the task satisfies the end condition 1. When the task for recovery is performed and each subsequent task satisfies the end condition 1, the sequence of FIG. 5 ends.

Figure 7A:
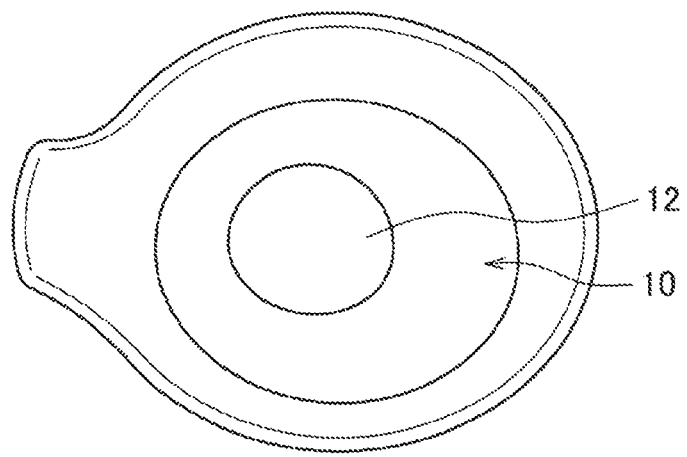
FIG. 7A is a schematic diagram illustrating an end condition 1 of a task 1.
Figure 7B:
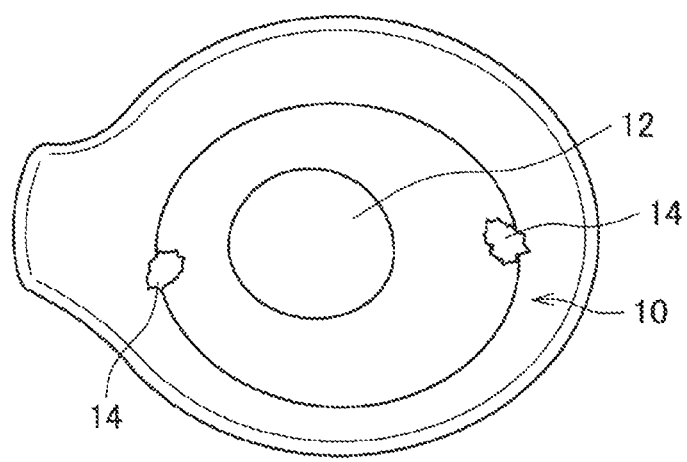
FIG. 7B is a schematic diagram illustrating an end condition 2 of the task 1.
Figure 7C:
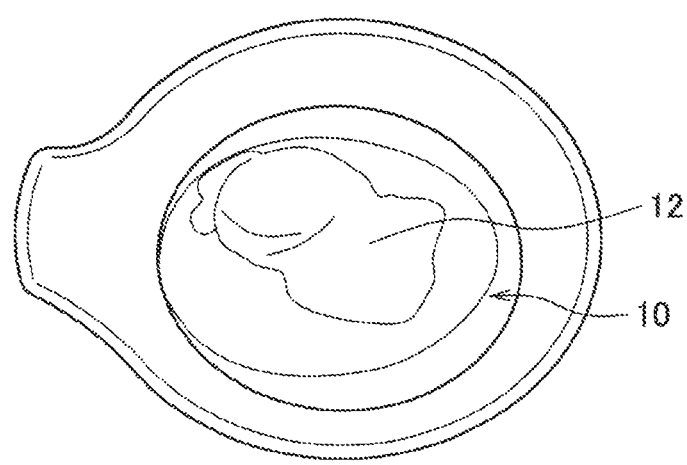
FIG. 7C is a schematic diagram illustrating an end condition 3 of the task 1.

FIGS. 7A, 7B, and 7C are schematic diagrams illustrating the end conditions 1, 2, and 3 of the task 1, respectively. FIG. 7A illustrates the end condition 1. As illustrated in FIG. 5, the end condition 1 is determined by "an image of a beautifully cracked egg". In a state illustrated in FIG. 7A, since an egg 10 is beautifully cracked, it is determined that the end condition 1 is satisfied.

In addition, FIG. 7B illustrates the end condition 2. As illustrated in FIG. 5, the end condition 2 is determined by "an image with a shell". In a state illustrated in FIG. 7B, since shells 14 are contained in the egg 10, it is determined that the end condition 2 is satisfied.

In addition, FIG. 7C illustrates the end condition 3. As illustrated in FIG. 5, the end condition 3 is determined by "an image of a broken yolk". In a state illustrated in FIG. 7C, since a yolk 12 is broken, it is determined that the end condition 3 is satisfied.

In the examples illustrated in FIGS. 7A, 7B, and 7C, it is determined by an image input to the image input device 218 whether or not any one of the end conditions 1 to 3 is satisfied. Note that, in the example illustrated in FIG. 5, most of the end conditions are determined by images input to the image input device 218. The determination by an image includes determination based on the shape, color, and the like of an object, and an end condition is determined by comparing an image when a task is completed with a current image. When an end condition is determined by an image, the end condition can be determined only by capturing an image at each break of work, so that a sequence can be easily constructed. In addition, depending on a task, an end determination is made on the basis of sound, temperature, a smell, a gas concentration, three-dimensional information, hardness and viscosity of an object, elasticity of an object, a pressure when an object is pushed, and the like. For example, in the task 7 of FIG. 5, an end condition 1 is determined when the temperature of the pan reaches a predetermined temperature, and for example, can be determined by the temperature detected by the temperature sensor 212. In addition, taking cooking as an example, an end determination is made on the basis of, for example, sound (such as sound of grilling meat), a smell, and the like generated during cooking.

In a case where the end condition is determined on the basis of sound, a smell, a gas concentration, and three-dimensional information, detection values of the sound input device 220, the smell sensor 214, the gas concentration sensor 216, and the three-dimensional information input device 210 are respectively used. In a case where the end condition is determined on the basis of hardness and viscosity of an object, elasticity of an object, a pressure when an object is pushed, and the like, detection values of the force sensor 170 and the torque sensor 180 can be used.

A flow of the processing will be described with reference to FIG. 2. Image information acquired by the image input device 218 is input to the image input unit 302 of the input unit 300. The data processing/recognition unit 320 performs predetermined processing on the image data to recognize the image data. Here, the predetermined processing includes, for example, processing performed as preprocessing of the recognition, such as processing for reducing noise. The image data is recognized, for example, by comparing, by a method such as block matching, a template image acquired in advance with an image acquired by the image input device 218, but a known method can be appropriately used.

The determination unit 330 determines end conditions 1 to 3 on the basis of the image data processed and recognized by the data processing/recognition unit 320. As an example, the end condition 1 is determined by the end determination unit 332, and the end conditions 2 and 3 are determined by the failure determination unit 334. For example, in a case where the image of FIG. 7A is acquired, the end determination unit 332 determines that the end condition 1 is satisfied.

The task planning unit 340 plans tasks on the basis of a determination result of the determination unit 330. The task switching unit 342 switches the tasks on the basis of whether or not the end conditions 1 to 3 are satisfied. The task execution unit 344 executes the task in a case where none of the end conditions is satisfied. For example, in a case where the end condition 1 is satisfied in the task 1 of FIG. 5, the task switching unit 342 switches the task 1 to the next task 5. In addition, in a case where the end condition 2 is satisfied in the task 1 of FIG. 5, the task switching unit 342 switches the task 1 to the task 2. In addition, in a case where none of the end conditions 1 to 3 is satisfied in the task 1 of FIG. 5, the task execution unit 344 executes the task 1.

The operation planning unit 350 plans operations of the robot 1000 on the basis of the tasks planned by the task planning unit 340. For example, in a case where the task 5 is planned to be performed, the moving route planning unit 350 plans a route along which the robot 1000 moves to a position of a container in which oil is added. The arm track planning unit 354 plans a track along which the arm 120 moves to grab the container in which oil is added after the robot 1000 has moved to the position of the container in which oil is added. The grip planning unit 356 plans movement of the hand 160 when gripping the container in which oil is added.

The control unit 360 controls the robot 1000 on the basis of the plan of the operation planning unit 350. The movement control unit 362 controls the actuators 150 that drive the wheels 100, on the basis of the route planned by the moving route planning unit 352. The arm control unit 364 controls the actuators 152 that drive the arm 120, on the basis of the track of the arm 120 planned by the arm track planning unit 354. The hand control unit 366 controls the actuators 154 that drive the hand 160, on the basis of the movement of the hand 160 planned by the grip planning unit 356.

5. Examples of Other Tasks

In the examples described above, an example in which an end condition of a task is determined mainly by an image has been described. In the following examples, a case will be described where an end condition is determined on the basis of other than an image. First, referring to FIG. 8, a case where the robot 1000 kneads bread dough will be taken as an example, and a case where an end condition is determined on the basis of a detection value of a pressure sensor will be described.

Bread dough is made by kneading flour, yeast, and water. The bread dough does not swell in the first place unless kneaded, but if the bread dough is kneaded too much, the bread dough becomes hard and does not swell. The bread dough is kneaded and rolled, the rolled bread dough is pushed at five points from above and four sides, for example, and an end condition is set in accordance with a pressure when the bread dough is pushed. The pressure when the bread dough is pushed can be obtained from a force detected by the force sensor 170 when the bread dough is pushed by the hand 160 and an area of the hand 160.

Figure 8:
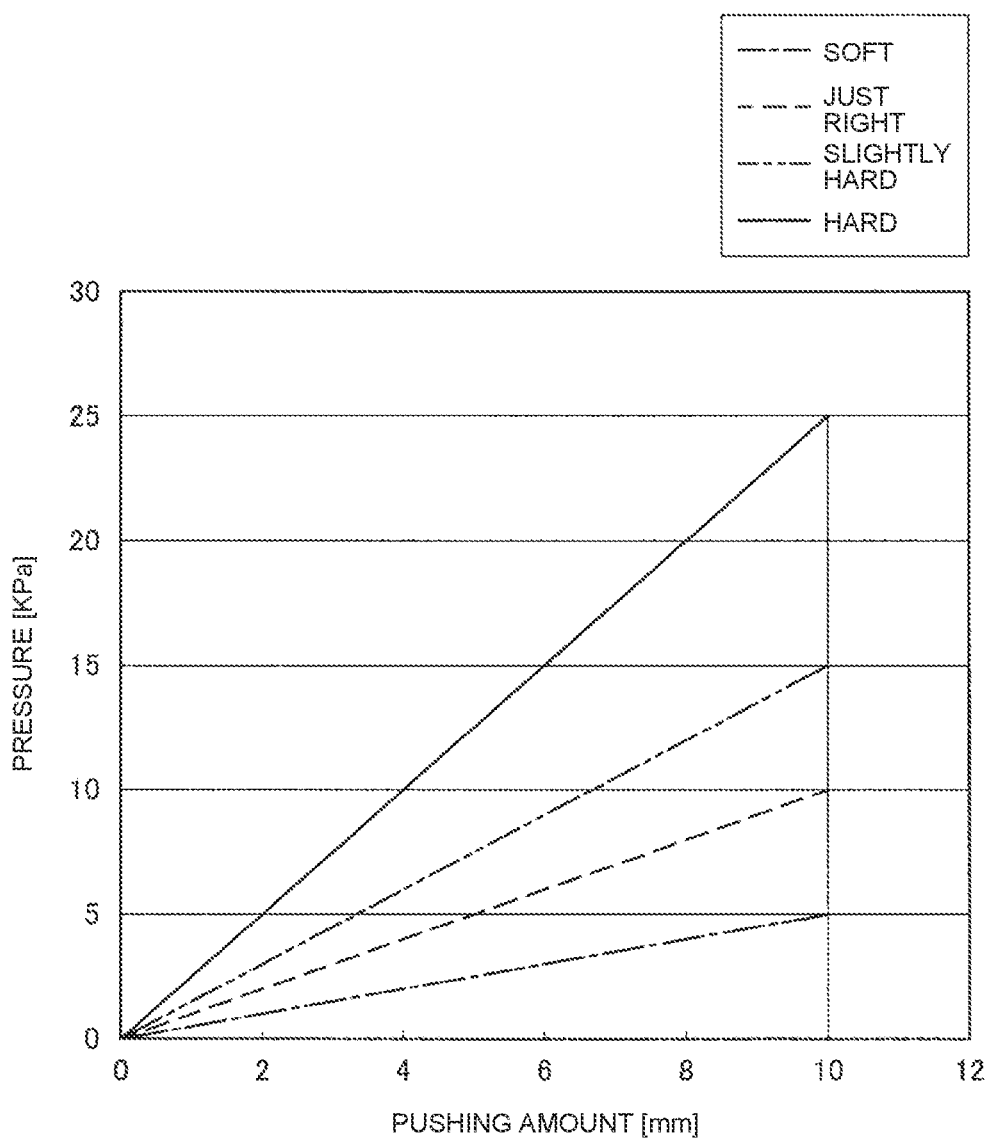
FIG. 8 is a characteristic diagram illustrating a relationship between a pushing amount by a hand (horizontal axis) and a pressure (vertical axis) when bread dough is pushed.

FIG. 8 is a characteristic diagram illustrating a relationship between a pushing amount by the hand 160 (horizontal axis) and a pressure (vertical axis) when the bread dough is pushed. A task here is to "knead and finish bread dough", and end conditions 1 to 3 are set.

In a case where the pushing amount and the pressure belong to an area below a broken line and above an alternate long and short dash line illustrated in FIG. 8 at all of the five points where the bread dough is pushed, it is determined that the end condition 1 is satisfied. Specifically, the end condition 1 is "the pushing amount is 10 mm and the pressure is in the range of 5 to 10 kPa". When the end condition 1 is satisfied, since the bread dough is kneaded appropriately, it is determined that "end kneading, execute the next task for baking bread".

In addition, in a case where the pushing amount and the pressure belong to an area above a solid line illustrated in FIG. 8 at any one of the five points where the bread dough is pushed, it is determined that the end condition 2 is satisfied. Specifically, the end condition 2 is "the pushing amount is 10 mm and the pressure is 25 KPa or more". When the end condition 2 is satisfied, since the bread dough is too hard due to excessive kneading, it is determined that "end kneading once and add water in the next task".

In addition, in a case where the pushing amount and the pressure belong to an area above an alternate long and two short dashes line and below the solid line illustrated in FIG. 8 at one or more of the five points where the bread dough is pushed, it is determined that the end condition 3 is satisfied. Specifically, the end condition 3 is "the pushing amount is 10 mm and the pressure is 15 to 25 KPa". When the end condition 3 is satisfied, since the bread dough is slightly hard, it is determined that "end kneading once, and in the next task, roll the bread dough after stretching the bread dough to make the bread dough even".

Figure 9A:
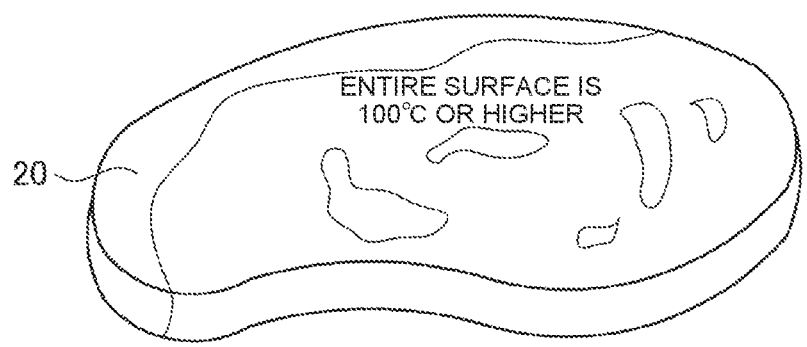
FIG. 9A is a schematic diagram for describing an end condition in a case where the robot grills steak meat.
Figure 9B:
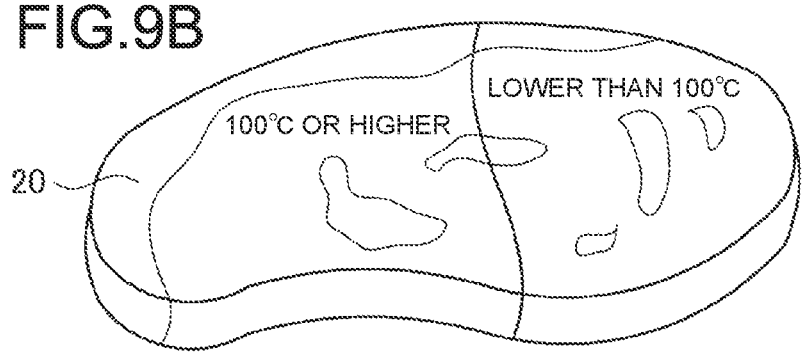
FIG. 9B is a schematic diagram for describing an end condition in the case where the robot grills steak meat.
Figure 9C:
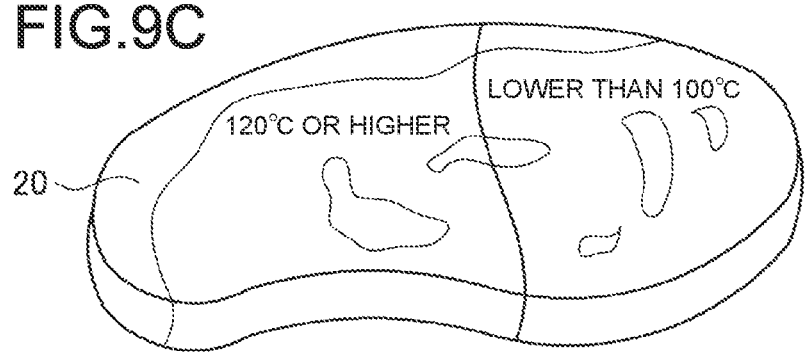
FIG. 9C is a schematic diagram for describing an end condition in the case where the robot grills steak meat.

Next, a case where the robot 1000 grills steak meat 20 will be described with reference to FIGS. 9A, 9B, and 9C. FIGS. 9A, 9B, and 9C are schematic diagrams illustrating the meat 20 just after being turned over, for which surface temperature of an upper side (opposite side of an iron plate) is measured by the temperature sensor 212. At this time, the surface temperature of the meat 20 is obtained using thermography or the like obtained by the temperature sensor 212. Here, description will be made assuming a task of first heating the surface with high heat when grilling steak meat or the like (task A). For example, to check the temperature of the meat 20, the meat 20 is turned over every 10 seconds.

FIG. 9A illustrates an end condition 1, and illustrates a state where the temperature of the entire surface of the meat is 100° C. or higher. In the case where the entire surface of the meat is 100° C. or higher, heating of the surface in the task A ends and the task A is switched to the next task B.

FIG. 9B illustrates an end condition 2, and illustrates a case where a part of the surface of the meat is 100° C. or higher and another part is lower than 100° C. In this case, since it is conceivable that heating is uneven due to a problem of the shape of the meat 20, the task is switched by assuming that the end condition 2 is satisfied, and in the next task C, a task of turning over the meat and pushing the area lower than 100° C. from above is executed.

FIG. 9C illustrates an end condition 3, and illustrates a case where extreme unevenness in heating occurs, in which a part of the surface of the meat is 120° C. or higher and another part is lower than 100° C. In this case, since it is assumed the temperature of the iron plate is uneven, the task is switched by assuming that the end condition 3 is satisfied, and in the next task D, a task of removing the meat from the iron plate once, and confirming the temperature of the iron plate by a temperature image is executed.

Figure 10A:
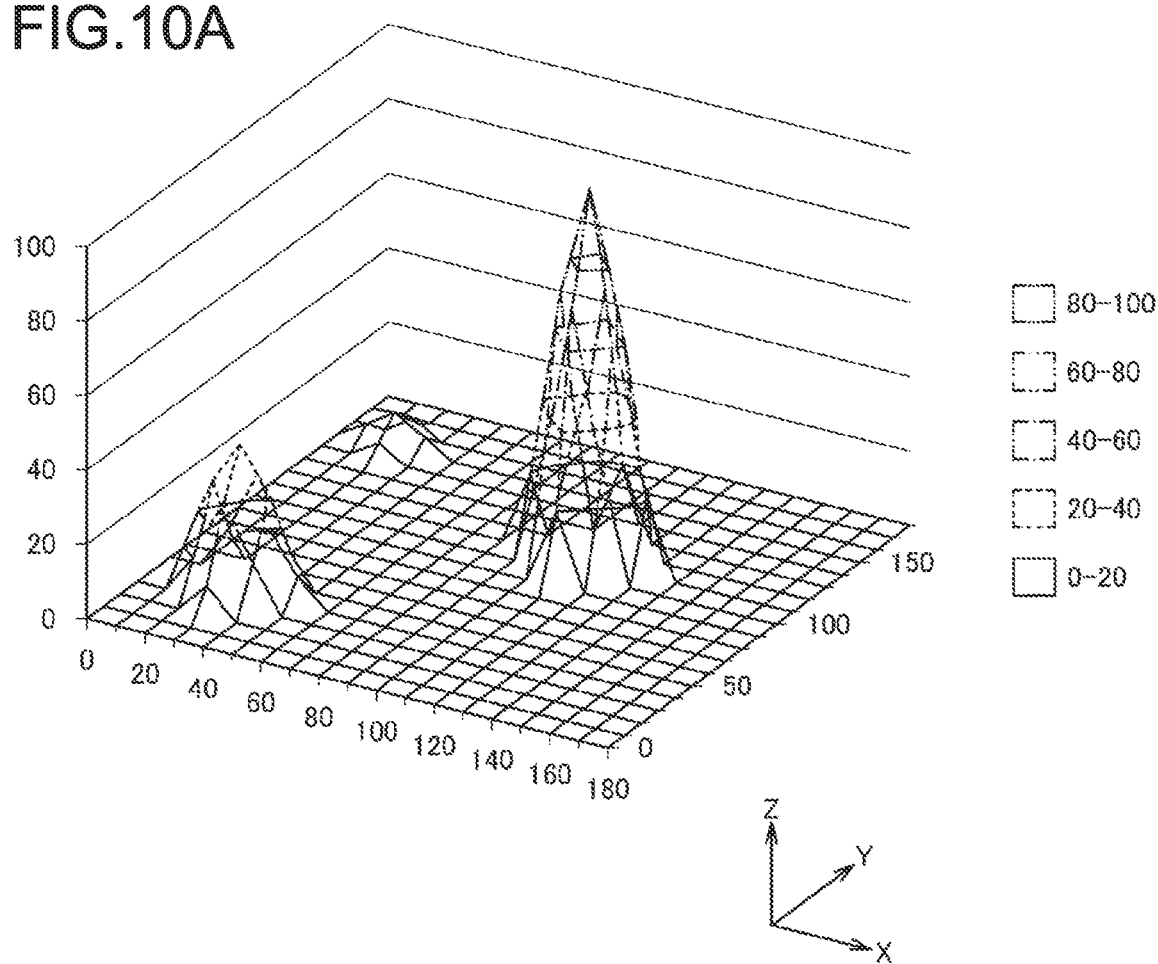
FIG. 10A is a schematic diagram for describing an end condition in a case where the robot cleans an ammonia odor.

Next, a case where the robot 1000 cleans an ammonia odor will be described with reference to FIGS. 10A, 10B, and 10C. FIGS. 10A, 10B, and 10C are characteristic diagrams illustrating results of measurement of an ammonia odor in a toilet. In FIGS. 10A, 10B, and 10C, an XY plane indicates an area of a floor of a toilet room. In addition, a Z axis indicates a measurement value of the ammonia odor. The ammonia odor can be measured by the smell sensor 214.

FIG. 10A illustrates a result of first measuring a smell near the floor. For example, a task of cleaning a portion where the ammonia odor exceeds "30" in a sensor value is assumed. In the case of FIG. 10A, three peaks are observed for the ammonia odor, and two of these peaks are portions where the sensor value exceeds "30".

In a task A, a task of wiping with water is assumed. The robot 1000 wipes the portion where the ammonia odor exceeds "30" in the sensor value with water for a certain period of time. FIG. 10B illustrates a result of the wiping with water. When the sensor values are less than "30" at all portions as a result of the wiping with water, the end condition 1 is satisfied, and the cleaning task A ends.

In FIG. 10B, since there remains one portion where the sensor value is "30" or more, the end condition 2 is satisfied, and the next cleaning task B is executed. In the cleaning task B, as an example, cleaning is performed using an acid (for example, citric acid) that has an effect of neutralizing ammonia. FIG. 10C illustrates a result of performing the task B on the portion where the sensor value is 30 or more in FIG. 10B. In FIG. 10C, since the sensor values are less than "30" at all portions, it is assumed that the end condition 3 of the task B is satisfied, and the cleaning task ends.

As described above, according to the present embodiment, since an operation performed by the robot 1000 includes a combination of single tasks, contents of the tasks can be easily set, and a sequence in which the tasks are combined can also be easily set. In addition, by determining an end condition, success or failure of a task can be easily determined, and tasks can be easily switched. With this configuration, since an operation completion condition of the robot 1000 can be set without performing any special processing, convenience can be greatly improved.

The preferred embodiments of the present disclosure have been described above in detail with reference to the accompanying drawings, but the technical scope of the present disclosure is not limited to such examples. It is obvious that a person having ordinary knowledge in the technical field of the present disclosure can come up with various alterations or modifications within the scope of the technical idea described in the claims, and needless to say, it is understood that the alterations and the modifications also belong to the technical scope of the present disclosure.

In addition, the effects described in the present specification are merely illustrative or exemplary, and are not limitative. That is, the technology according to the present disclosure may exhibit other effects that are obvious to those skilled in the art from the description of the present specification, in addition to or in place of the effects described above.

Note that the following configurations also belong to the technical scope of the present disclosure.

(1) A robot control apparatus comprising:
    a determination unit configured to determine whether or not an end condition of a task is satisfied when a robot performs the task; and
    a switching unit configured to perform switching to a next task corresponding to the end condition in a case where the end condition is satisfied.

(2) The robot control apparatus according to (1), wherein the determination unit determines which of a plurality of the end conditions is satisfied, and the switching unit performs switching to the next task corresponding to the end condition determined to be satisfied by the determination unit among the plurality of end conditions.
(3) The robot control apparatus according to (1) or (2), wherein the end condition includes a success condition indicating that the task succeeded and a failure condition indicating that the task failed.
(4) The robot control apparatus according to any one of (1) to (3), further comprising an execution unit configured to execute the task in a case where the end condition is not satisfied.
(5) The robot control apparatus according to any one of (1) to (4), wherein the end condition includes a condition corresponding to the next task connected to a final task of a series of sequences and a condition corresponding to the next task for recovering the task resulted in failure.
(6) The robot control apparatus according to any one of (1) to (5), wherein the determination unit determines whether or not the end condition is satisfied on the basis of an image acquired when the robot performs the task.
(7) The robot control apparatus according to any one of (1) to (5), wherein the determination unit determines whether or not the end condition is satisfied on the basis of a three-dimensional shape of an object acquired when the robot performs the task or a pressure when the robot pushes an object.
(8) The robot control apparatus according to any one of (1) to (5), wherein the determination unit determines whether or not the end condition is satisfied on the basis of temperature, a smell, a gas concentration, or sound acquired when the robot performs the task.
(9) The robot control apparatus according to any one of (1) to (5), wherein the determination unit determines whether or not the end condition is satisfied on the basis of an angular position of an actuator provided to a joint or a wheel of the robot, an angular velocity of the actuator, a current value flowing through the actuator, or torque applied to the joint.
(10) The robot control apparatus according to any one of (1) to (9), further comprising:
an operation planning unit configured to plan an operation of the robot for executing the task; and
a control unit configured to control the robot on the basis of the operation planned by the operation planning unit.
(11) A robot control method comprising:
determining whether or not an end condition of a task is satisfied when a robot performs the task; and
performing switching to a next task corresponding to the end condition in a case where the end condition is satisfied.

REFERENCE SIGNS LIST

330 DETERMINATION UNIT
342 TASK SWITCHING UNIT
344 TASK EXECUTION UNIT
350 OPERATION PLANNING UNIT
360 CONTROL UNIT

The invention claimed is:
1. A robot control apparatus, comprising:
a processor configured to:
determine whether one of a first end condition or a second end condition of a first task is satisfied in a case where a robot performs the first task;
control the robot to switch to a second task corresponding to the first end condition in a case where the first end condition is satisfied; and
control the robot to switch to a third task, different from the second task, corresponding to the second end condition in a case where the second end condition is satisfied.
2. The robot control apparatus according to claim 1, wherein the processor is further configured to:
determine which of a plurality of end conditions is satisfied and
control the robot to switch to a next task corresponding to one of the plurality of end conditions determined to be satisfied among the plurality of end conditions.
3. The robot control apparatus according to claim 1, wherein the first end condition includes a success condition indicating that the first task succeeded and a failure condition indicating that the first task failed.
4. The robot control apparatus according to claim 1, wherein the processor is further configured to execute the first task in a case where one of the first end condition or the second end condition is not satisfied.
5. The robot control apparatus according to claim 1, wherein the first end condition includes a condition corresponding to a next task connected to a final task of a series of sequences and a condition corresponding to the next task for recovering the first task.
6. The robot control apparatus according to claim 1, wherein the processor is further configured to determine whether the first end condition is satisfied based on an image acquired at a time at which the robot performs the first task.
7. The robot control apparatus according to claim 1, wherein the processor is further configured to determine whether the first end condition is satisfied based on one of a three-dimensional shape of an object acquired at a time at which the robot performs the first task or a pressure at a time at which the robot pushes the object.
8. The robot control apparatus according to claim 1, wherein the processor is further configured to determine whether the first end condition is satisfied based on one of temperature, a smell, a gas concentration, or sound acquired at a time at which the robot performs the first task.
9. The robot control apparatus according to claim 1, wherein the processor is further configured to determine whether the first end condition is satisfied based on one of an angular position of an actuator provided to a joint or a wheel of the robot, an angular velocity of the actuator, a current value flowing through the actuator, or torque applied to the joint.
10. The robot control apparatus according to claim 1, wherein the processor is further configured to:
plan an operation of the robot for execution of the first task; and
control the robot based on the planned operation.
11. A robot control method, comprising:
determining whether one of a first end condition or a second end condition of a first task is satisfied in a case where a robot performs the first task;
controlling the robot to switch to a second task corresponding to the first end condition in a case where the first end condition is satisfied; and
controlling the robot to switch to a third task, different from the second task, corresponding to the second end condition in a case where the second end condition is satisfied.

* * * * *